(12) United States Patent
Santra et al.

(10) Patent No.: US 11,866,637 B2
(45) Date of Patent: Jan. 9, 2024

(54) SYNTHESIS AND USE OF GRAFTED GRAPHENE IN WELLBORE CONSTRUCTION FLUIDS FOR LUBRICATION AND CORROSION INHIBITION

(71) Applicant: ARAMCO SERVICES COMPANY, Houston, TX (US)

(72) Inventors: Ashok Santra, The Woodlands, TX (US); Carl Thaemlitz, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/657,439

(22) Filed: Mar. 31, 2022

(65) Prior Publication Data

US 2022/0315825 A1   Oct. 6, 2022

Related U.S. Application Data

(60) Provisional application No. 63/168,412, filed on Mar. 31, 2021.

(51) Int. Cl.
  *C09K 8/12*   (2006.01)
  *C08F 292/00*   (2006.01)
  (Continued)

(52) U.S. Cl.
  CPC .............. *C09K 8/12* (2013.01); *C08F 292/00* (2013.01); *E21B 21/00* (2013.01); *E21B 41/02* (2013.01)

(58) Field of Classification Search
  None
  See application file for complete search history.

(56) References Cited

U.S. PATENT DOCUMENTS

| 8,720,570 B2 | 5/2014 | Seth et al. |
| 8,822,386 B2 | 9/2014 | Quintero et al. |

(Continued)

FOREIGN PATENT DOCUMENTS

| CN | 108165069 A | 6/2018 |
| WO | 2009089391 A2 | 7/2009 |
| WO | 2015030794 A1 | 3/2015 |

OTHER PUBLICATIONS

Advincula, Rigoberto C., "Graphene Based Nanomaterials and Coatings", Paper No. 13525, NACE International Corrosion Conference & Expo 2019, NACE International, 2019, pp. 1-8 (8 pages).

(Continued)

*Primary Examiner* — Andrew Sue-Ako
(74) *Attorney, Agent, or Firm* — Osha Bergman Watanabe & Burton LLP

(57) ABSTRACT

A composition of matter including a mono-facial polymer-grafted graphene particle and an aqueous-based drilling fluid is provided. In the composition, a first side of the graphene particle has a grafted polymer. A method of lubricating a tool surface using the composition of matter is also provided. The method includes providing an aqueous-based drilling fluid, the aqueous-based drilling fluid having a mono-facial polymer-grafted graphene particle, and introducing the aqueous-based drilling fluid into a wellbore such that it contacts a tool surface to form a coated tool. A drilling tool having a mono-facial polymer-grafted graphene particle adhered to its surface is also provided.

11 Claims, 1 Drawing Sheet

(51) Int. Cl.
*E21B 21/00* (2006.01)
*E21B 41/02* (2006.01)

(56) References Cited

U.S. PATENT DOCUMENTS

| | | |
|---|---|---|
| 2012/0245058 A1 | 9/2012 | Monteiro et al. |
| 2013/0043028 A1 | 2/2013 | Chakraborty |
| 2015/0173883 A1 | 6/2015 | Ingber et al. |
| 2015/0218921 A1* | 8/2015 | Suresh .................. E21B 43/20 |
| | | 166/305.1 |
| 2016/0326421 A1 | 11/2016 | Yang |
| 2017/0173546 A1* | 6/2017 | Cheng .................. C09K 23/14 |
| 2019/0016943 A1 | 1/2019 | Ren et al. |
| 2019/0225872 A1 | 7/2019 | Cox et al. |
| 2021/0395093 A1* | 12/2021 | Huang .................. C09K 8/506 |

OTHER PUBLICATIONS

De Leon, Al C., et al., "Distinct Chemical and Physical Properties of Janus Nanosheets", ACSNano, ASC Publications, vol. 11, Jul. 2017, pp. 7485-7493 (9 pages).

Ng, Sze-Wing, et al., "Graphen-based two-dimensional Janus materials", NPG Asia Materials, vol. 10, 2018, pp. 217-237 (21 pages).

Wu, Hao, et al., "Janus graphene oxide nanosheets prepared via Pickering emulsion template", Carbon, ScienceDirect, Elsevier Ltd., vol. 93, May 2015, pp. 473-483 (11 pages).

Ng et al., "Graphene-based two-dimensional Janus materials," NPG Asia Materials, 2018, 10:217-237, 21 pages.

International Search Report Issued in Corresponding Application No. PCT/US2022/022770, dated Jul. 21, 2022, 5 pages.

Written Opinion Issued in Corresponding Application No. PCT/US2022/022770, dated Jul. 21, 2022, 6 pages.

* cited by examiner

SYNTHESIS AND USE OF GRAFTED GRAPHENE IN WELLBORE CONSTRUCTION FLUIDS FOR LUBRICATION AND CORROSION INHIBITION

BACKGROUND

During drilling operations, a drilling fluid, which may also be referred to as drilling mud, is circulated through the wellbore to cool and lubricate the drill bit, to convey rock cuttings to the surface, and to support the wellbore against collapse and intrusion of fluids from the formation, among other purposes.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect embodiments disclosed relate to a composition of matter comprising a mono-facial polymer-grafted graphene particle and a aqueous-based drilling fluid. In the disclosed composition a first side of the graphene particle comprises a grafted polymer.

In another aspect embodiments disclosed relate to method of lubricating a tool surface. The method includes providing an aqueous-based drilling fluid, the aqueous-based drilling fluid having a mono-facial polymer-grafted graphene particle, and introducing the aqueous-based drilling fluid into a wellbore such that it contacts a tool surface to form a coated tool.

In yet another aspect, embodiments disclosed relate to an apparatus comprising a drilling tool having a mono-facial polymer-grafted graphene particle adhered to a surface of the drilling tool.

Other aspects and advantages of the claimed subject matter will be apparent from the following description and the appended claims.

DETAILED DESCRIPTION

Figure 1:
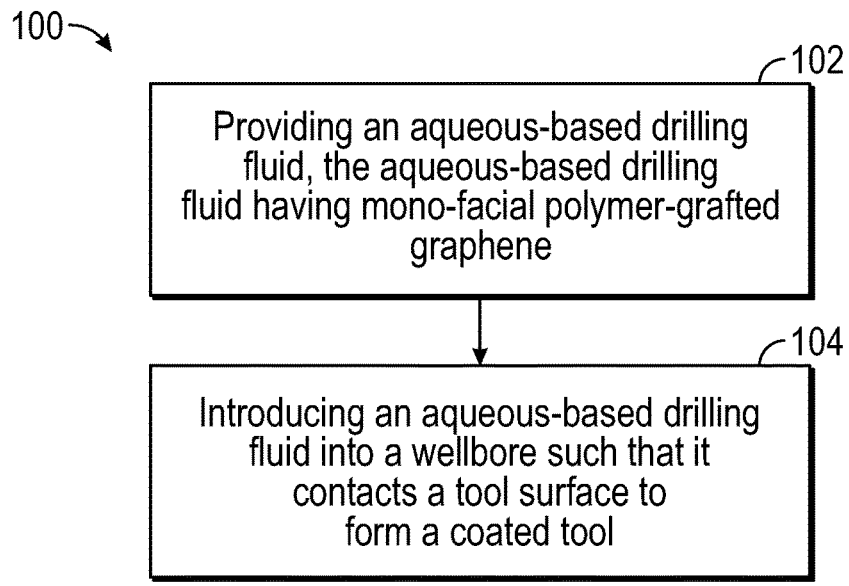
FIG. 1 is a block flow diagram of an embodiment method of lubricating a tool surface.

Oil drilling operations lead to significant wear and tear on downhole equipment, such as drilling tools. A corrosion inhibitor and lubrication are often used with downhole tools in order to extend the lifetime of the tool in wellbore and drilling conditions. Graphene is a known solid lubricant. However, when graphene is applied directly to tool surfaces, its weak adherence to metal surfaces limits its effectiveness. Graphene may detach from the surfaces of metallic tools, thereby exposing the surface to corrosive environments as well as reducing lubricity.

Embodiments in accordance with the present disclosure generally relate to compositions and methods of use for a mono-facial polymer-grafted graphene particle. The mono-facial polymer-grafted graphene particle may be used with aqueous-based drilling fluids as a tool lubricant and a corrosion inhibitor. The mono-facial polymer-grafted graphene particle may strongly adhere to a tool surface, overcoming problems with reduced lubricity and tool corrosion compared to prior methods.

In one or more embodiments, a mono-facial polymer-grafted graphene particle, where a first side of the graphene portion of the particle comprises a grafted polymer, is disclosed. In one or more embodiments, the mono-facial polymer-grafted graphene particle is part of an aqueous-based drilling fluid.

Mono-Facial Polymer Grafted Graphene Particle

One or more embodiments include mono-facial polymer-grafted graphene particle that include graphene. The graphene used to form the one or more embodiment particles may have a hexagonal crystal structure. Graphene typically has a bulk density of from about 0.03 to about 1.0 g/cm$^2$ (grams per centimeter squared).

Graphene used for one or more embodiments may be an appropriate size for use as part of a water-based drilling fluid or "mud". For example, the graphene may have a thickness in a range of from about 0.5 to 20 nm (nanometers), a length in a range of from about 0.5 to 50 μm (micrometers), and a width in a range of from about 0.5 to 50 μm; however, this may vary according to the needs of the application.

Graphene used for one or more embodiments may be an appropriate shape for use in an aqueous-based drilling fluid. For example, graphene particles may be flat or non-flat sheets that are in common geometric shapes, such as circular, square, and triangular forms. Geometric and non-geometric configurations are not limited except as to provide for a surface for grafting with a polymer. For example, the graphene may have a slightly parabolic shape such as to mimic or conform to the shape of a material or tool surface that is in a wellbore. Other configurations are possible and envisioned as part of the embodiment particle.

Graphene used for embodiment particles may have appropriate surface chemistry for use as corrosion inhibitors for tools in water-based muds. In some embodiments, the graphene surface is hydrophobic, meaning the graphene surface has a water contact angle of greater than 90°.

The embodiment mono-facial polymer-grafted graphene particle also includes a polymer that is grafted to a first side of the graphene particle and has an anchor functional group. The grafted polymers may be made from any suitable monomer that is configured to graft to a graphene particle and to adsorb at least a portion of the polymer onto a surface, such as onto the surface of a tool, or a formation, or a wellbore wall, using an "anchor functional group". The "anchor functional group" is a portion of the grafted polymer that is configured to adsorb via physisorption or chemisorption onto a surface such that the embodiment particle adheres to the surface. Physisorption means that relatively weak interactions, such as electrostatic interactions or Van der Waals forces, occur between the polymer and the surface. Chemisorption means that stronger interactions between the polymer and the surface take place. Chemisorption can be characterized as reactive, meaning at least one chemical bond is formed between the polymer and the surface, and non-reactive, where the polymer strongly adsorbs to the surface without forming a chemical bond. The polymer may be grafted to the graphene surface by reacting a double bond on a monomer with the graphene surface to form a covalent bond between the graphene particle and the monomer.

In considering such functionalities, it is noted that tool surfaces may be composed of a variety of materials including, but not limited to, metallic materials, such as a pure metal (for example, titanium) or an alloy (for example, chromium steel); and non-metallic materials, such as ceramics, metal oxides, polymers, and composites thereof. Generally, adsorption to a tool surface is strong enough that the anchor groups are not labile under formation conditions, meaning they will not readily be displaced from the tool surface. The polymer with the anchor functional group is hydrophilic, so it is suitable for use in water-based muds.

Useful anchor functional groups may include, but are not limited to, carboxylic acids, silanes, phosphonates and combinations thereof. In one or more embodiments, the grafted polymer for the embodiment particle may have carboxylic acid anchor functional groups. Examples of monomers that may be useful to create grafted polymers having carboxylic acid anchor functional groups may include, but are not limited to, maleic acid, acrylic acid, and itaconic acid.

In one or more embodiments, the grafted polymer for the embodiment particle may have silane anchor functional groups. Embodiment monomers that may be useful to create grafted polymers having silane anchor functional groups may include, but are not limited to, the structures shown in Structures (I)-(V):

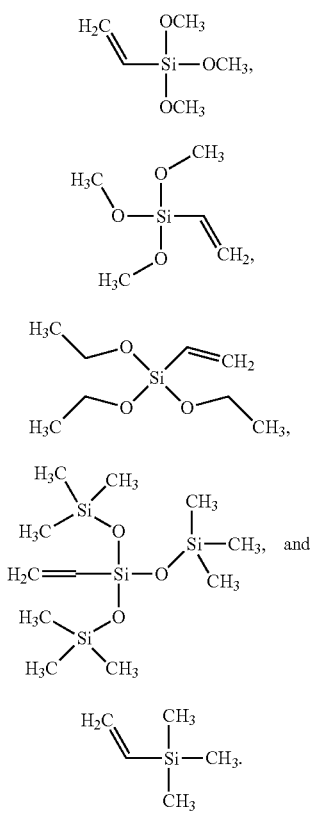

Structures (I)-(V) are vinyltrimethoxysilane, trimethoxyvinylsilane, triethoxyvinylsilane, vinyltris(trimethylsiloxy)silane, and vinyltrimethylsilane, respectively. The monomer may be allyltrimethoxysilane:

In one or more embodiments, the grafted polymer for the embodiment particle may have phosphonic anchor functional groups. Embodiment monomers that may be useful to create grafted polymers having phosphonic anchor functional groups may include, but are not limited to, the structures shown in Structures (VI)-(IX):

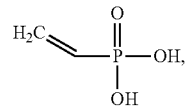

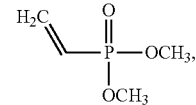

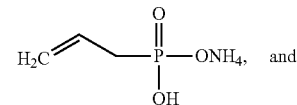

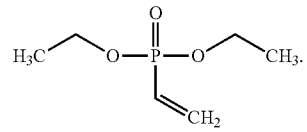

Structures (VI)-(IX) are vinylphosphonic acid, dimethyl vinylphosphonate, allylphosphonic acid, monoammonium salt, and diethyl vinylphosphonate, respectively.

The polymer with the anchor functional groups may be formed by grafting a monomer unit to a graphene oxide surface and polymerizing one type of monomer together to form a polymer. A monomer reacts with the surface of graphene oxide to form a grafted monomer unit. Additional monomer units then add to the grafted monomer unit to form a grafted polymer. The length of the polymer with the anchor functional groups may be formed from a polymerization reaction of more than one monomer unit to about 50 monomer units. The polymers formed are hydrophilic, so they are suitable for use in water-based muds.

Polymers with the anchor functional groups may include any suitable molecular structure that permits the anchor functionality to be uninhibited, such as linear, branched, random, alternating, block, and grafted.

One or more embodiments may have a particle that is mono-facial, meaning that the first side of the graphene particle is grafted with a polymer and the second side is not. As such, embodiment graphene particles have a "Janus-like" structure due to the difference in functionality of the polymer-grafted side and the graphene side.

Method of Making Mono-Facial Polymer Grafted Graphene Particle

In one or more embodiments, a method of making includes an embodiment mono-facial polymer-grafted graphene particle. One or more embodiments may include preparing an emulsion, adding a monomer to the emulsion, initiating polymerization, and polymerizing the monomer to form the embodiment mono-facial polymer-grafted graphene particle.

Embodiment methods may include preparing an emulsion. The preparing step may include mixing water, wax, and graphene oxide, at an elevated temperature, and agitating the mixture to form an emulsion. The term "elevated temperature" means a temperature that is greater than room temperature. The elevated temperature for preparing the emulsion is not particularly limited provided that the elevated temperature is in a range that is greater than the melting temperature of the wax and is less than the boiling point of water. In some embodiments, the temperature is in a range of from about 60 to 90° C.

In preparing the emulsions, appropriate amounts of water and graphene oxide are mixed and agitated, creating a slurry. Such agitation may include stirring, sonication, and other suitable agitation methods, to distribute the graphene oxide particles homogenously throughout the water. Then, wax may be added to the graphene/water slurry to create a second slurry—a wax-in-water slurry. The wax may be added gradually as a solid. In one or more embodiments, as the solid wax particles heats, the molten wax droplets form. In such instances, the molten wax droplets may have a diameter of from about 0.05 to 100 μm (micrometers or microns). The second slurry may be agitated to form an emulsion of wax in water with graphene oxide particles.

The emulsions may comprise water in a range of from about 50 to 85 wt % (weight percent), graphene oxide in a range of from about 10 to 30 wt %, and wax in a range of from about 10 to 35 wt %. The amounts of water, graphene oxide, and wax may be adjusted to achieve a desired droplet size of the molten wax in the slurry.

In one or more embodiments, an acid, such as hydrochloric acid, may be present in an amount in a range of from about 0.03 to 0.1 wt % of the emulsion as compared to the mass of water. The HCl is used to adjust the pH of the emulsion to a range of about 2 to 3.

During the emulsification of the second slurry, graphene oxide collects at the interface of the water and the molten wax, forming a Pickering emulsion. The graphene oxide has wax affiliated with one of its two opposing surfaces; water with the other. Once the Pickering emulsion has formed, the emulsion may then be cooled such that the wax droplets re-solidify. Upon solidification, the wax particles (formerly droplets) are coated in the graphene oxide particles; the graphene particles are attached to the surface of the wax. The wax particles coated with graphene oxide particles may be separated from the water using known means in the art, such as by filtration.

The wax/graphene oxide particles may be dispersed in a solution of sodium hydroxide at a pH of about 10, agitated for about 5 to 10 minutes, filtered, and recovered.

Embodiment methods include forming a suspension with the previously separated wax/graphene oxide particles. The wax/graphene oxide particles may be suspended in a solution of equal parts water and ethanol by weight. Into the suspension an amount of monomer and initiator is added. The weight ratio of graphene:monomer may be in a range of from about 1:1 to about 1:20. Suitable initiators may include, but are not limited to, α-bromoisobutyryl bromide (referred to here as "ATRP") and trithiocarbonates (referred to here as "RAFT agents"). The initiator may be included in an amount ranging from about 2 to 15 mol % (mole percent) based on the amount of monomer. In one or more embodiments, the monomer added may have a carboxylic acid anchor functional group. In one or more embodiments, the monomer added may have a silane anchor functional group. In one or more embodiments, the monomer added may have a phosphonic anchor functional group.

Once a monomer and initiator are added, the suspension is stirred for a period in a range of from about 5 to 24 hours at a temperature of in a range of from about 30 to 90° C. to facilitate polymerization on the non-wax side of the graphene particle. Polymerization generally does not occur at a temperature that would melt the wax particles. The rate of polymerization may be increased by utilizing increased reaction temperatures. The reaction time typically does not control the length of the polymer chains. The length of the polymer chains is determined by the amount of monomer added to the suspension.

Once polymerization is complete, embodiment monofacial polymer grafted graphene particles have formed.

In order to recover the embodiment mono-facial polymer grafted graphene particles from the surface of the wax particles, the wax particles are heated to a temperature greater than the melting point of the wax, generally in a range of from about 60 to about 95° C. The embodiment mono-facial polymer-grafted graphene particle is separated via filtration. The embodiment particles may be rinsed with warm water to remove residual wax from the non-polymerized size of the particle. The embodiment mono-facial polymer grafted graphene particles may be stored as a powder.

An Aqueous-Based Drilling Fluid with Mono-Facial Polymer Grafted Graphene Particle In another aspect, embodiments disclosed relate to a composition of matter of an aqueous-base drilling fluid with the previously described embodiment mono-facial polymer-grafted graphene particle.

One or more embodiments of the drilling fluid include an aqueous-base fluid. The aqueous-based fluid includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the operation of the drilling fluid.

The one or more embodiments, the drilling fluid may contain water in a range of from about 50 wt % to 97 wt % based on the total weight of the drilling fluid. In one or more embodiments, the embodiment drilling fluid may comprise greater than 70 wt % water based on the total weight of the drilling fluid.

In one or more embodiments, the water used for the embodiment drilling fluid may have an elevated level of salts or ions versus fresh water, such as salts or ions naturally-present in formation water, production water, seawater, and brines. In one or more embodiments, salts or ions are added to the water used to increase the level of a salt or ion in the water to effect certain properties, such as density of the drilling fluid or to mitigate the swelling of clays that come into contact with the drilling fluid. Without being bound by any theory, increasing the saturation of water by increasing the salt concentration or other organic compound concentration in the water may increase the density of the water, and thus, the drilling fluid. Suitable salts may include, but are not limited to, alkali metal halides, such as chlorides, hydroxides, or carboxylates. In one or more embodiments, salts included as part of the aqueous-based fluid may include salts that disassociate into ions of sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, and fluorides, and combinations thereof. Without being bound by any theory, brines may be used to create osmotic balance between the drilling fluid and portions of the subterranean formation, such as swellable clays. Salts present in aqueous-based drilling fluids may affect the electrostatic interactions between the polymers described here and the surface of tools used in drilling.

In one or more embodiments, the embodiment drilling fluid may comprise one or more salts in an amount that ranges from about 1 to about 300 ppb (pounds per barrel). For example, the drilling fluid may contain the one or more salts in an amount ranging from a lower limit of any of 1, 10, 50, 80, 100, 120, 150, 180, 200, 250 and 280 ppb, to an upper limit of any of 20, 30, 40, 50, 70, 100, 120, 150, 180, 200, 220, 240, 260, 280 and 300 ppb, where any lower limit can be used in combination with any mathematically-compatible upper limit.

In one or more embodiments, the embodiment drilling fluid may comprise a suitable amount of the embodiment monofacial polymer-grafted graphene particle to reduce corrosion of drilling tools. In one or more embodiments, the embodiment monofacial polymer-grafted graphene particle is present embodiment drilling fluid in a range of from about 0.01 ppb to 10 ppb. For example, the drilling fluid may contain the embodiment monofacial polymer-grafted graphene particle in an amount ranging from a lower limit of any of 0.01, 0.05, 0.10, 0.25, 0.5, 1.0, 1.5 and 2.0 ppb, to an upper limit of any of 2.5, 3.0, 3.5, 4.0, 4.5, 5.0, 6.0, 7.0, 8.0, 9.0, and 10.0 ppb, where any lower limit can be used in combination with any mathematically-compatible upper limit In one or more embodiments, the embodiment drilling fluid may include at least one pH adjuster. The pH adjuster may be at least one alkali compound. Examples of alkali compounds may include, but are not limited to, lime (calcium hydroxide, calcium oxide, or a mixture thereof), soda ash (sodium carbonate), sodium hydroxide, potassium hydroxide, and combinations thereof. The alkali compounds may react with gases, such as $CO_2$ or $H_2S$ (also known as acid gases), encountered by the drilling fluid composition during drilling operations and prevent the gases from hydrolyzing components of the drilling fluid composition. Some embodiment drilling fluid compositions may include a pH adjuster in a range of from about 0.01 wt % to about 0.7 wt %, such as from 0.01 wt % to 0.5 wt %, from 0.01 wt % to 0.3 wt %, from 0.01 wt % to 0.1 wt %, from 0.01 wt % to 0.05 wt %, from 0.05 wt % to 0.7 wt %, from 0.05 wt % to 0.5 wt %, from 0.05 wt % to 0.3 wt %, from 0.05 wt % to 0.1 wt %, from 0.1 wt % to 0.7 wt %, from 0.1 wt % to 0.5 wt %, from 0.1 wt % to 0.3 wt %, from 0.3 wt % to 0.7 wt %, from 0.3 wt % to 0.5 wt %, and from 0.5 wt % to 0.7 wt % pH adjuster, based on the total weight of the drilling fluid composition. In one or more embodiments, the drilling fluid compositions may optionally include from 0.01 ppb to 10 ppb of at least one pH adjuster based on the total volume of the drilling fluid composition.

Embodiment drilling fluids may have a neutral or alkaline pH. In one or more embodiments, the drilling fluid may have a pH ranging from about 7, 7.5, 8, 8.5, 9, 9.5, and 10, to about 7.5, 8, 8.5, 9, 9.5, 10, 10.5, and 11, where any lower limit may be combined with any mathematically feasible upper limit.

In one or more embodiments, the embodiment drilling fluid may include weighting agents, which may be dispersed in the drilling fluid. The solids may be finely divided and have a specific gravity (SG) that when added to an aqueous-based fluid increases the density of the drilling fluid. Examples of suitable weighting materials include, but are not limited to, barite (minimum SG of 4.20), hematite (minimum SG of 5.05), calcium carbonate (minimum SG of 2.7-2.8), siderite (minimum SG of 3.8), ilmenite (minimum SG of 4.6), magnesium tetroxide (minimum SG of 4.8), and combinations thereof.

The embodiment drilling fluid may include an amount of weighting material sufficient to increase the density of the drilling fluid composition to support the wellbore and prevent fluid intrusion. In one or more embodiments, the drilling fluid composition may include weighting material in a range of from about 1 wt % to about 30 wt % based on the total weight of the drilling fluid composition. For example, the drilling fluid may contain weighting agents in an amount ranging from about 1 ppb to about 700 ppb, such as from about 10 to about 650 ppb, from about 50 ppb to about 700 ppb, or from about 100 ppb to about 600 ppb, or from about 200 ppb to about 500 ppb.

In one or more embodiments, the drilling fluid may have a density in a range of from about 62 pounds cubic foot (pcf) to about 170 pcf as measured using Fann Model 140 Mud Balance according to ASTM Standard D4380. For instance, the drilling fluid may have a density in a range of from about 63 pcf to about 150 pcf, from 65 pcf to 140 pcf, from 70 pcf to 160 pcf, from 80 pcf to 150 pcf, from 90 pcf to 140 pcf, from 100 pcf to 160 pcf, from 70 pcf to 150 pcf, from 70 pcf to 100 pcf, and from 120 pcf to 160 pcf. The drilling fluid may have a density that is greater than or equal to 62 pcf, such as greater than or equal to 70 pcf, and such as greater than or equal to 100 pcf.

Embodiment drilling fluids having the embodiment mono-facial polymer-grafted graphene particle may have improved properties as compared to comparative drilling fluids without the embodiment mono-facial polymer-grafted graphene particle. Such improvements may include a reduced coefficient of friction (CoF). The CoF, also known as the lubricity coefficient, is an important property in a drilling fluid because corrosion may increase the surface roughness of the drill components, which would lead to an increased friction coefficient. Coefficient of friction values reported here are based on standard testing procedures using a Fann® Model 212EP Lubricity Tester (Fann Instruments, Houston, Tex., USA). In some embodiments, the coefficient of friction for the drilling fluid may be less than about 0.3, such as 0.2, 0.1, 0.05 or 0.01.

While the present disclosure describes using monofacial polymer-grafted graphene particles in drilling fluids, the disclosed particles may be used in a variety of fluids in oil and gas applications. As may be appreciated by those skilled in the art, embodiment monofacial polymer-grafted graphene particles may be useful in completion fluids, workover fluids, spacer fluids and others.

Method of Using an Aqueous-Based Drilling Fluid with Mono-Facial Polymer Grafted Graphene Particle In one or more embodiments, disclosed are methods of using the previously described compositions for lubricating a tool surface in drilling operations. As shown in FIG. 1, in one or more embodiments, the method 100 includes providing an embodiment drilling fluid 102, the embodiment drilling fluid having an embodiment mono-facial polymer-grafted graphene particle as previously described. The method may include introducing the embodiment drilling fluid into a wellbore such that it contacts a tool surface 104. In one or more embodiments, the embodiment mono-facial polymer-grafted graphene particle may contact the surface of the tool and, due to the previously described anchoring functionality, may absorb onto the surface of the tool surface. The modified tool surface with the absorbed embodiment graphene particle has a reduced surface friction and improved corrosion resistance than an untreated tool surface.

Figure 2:
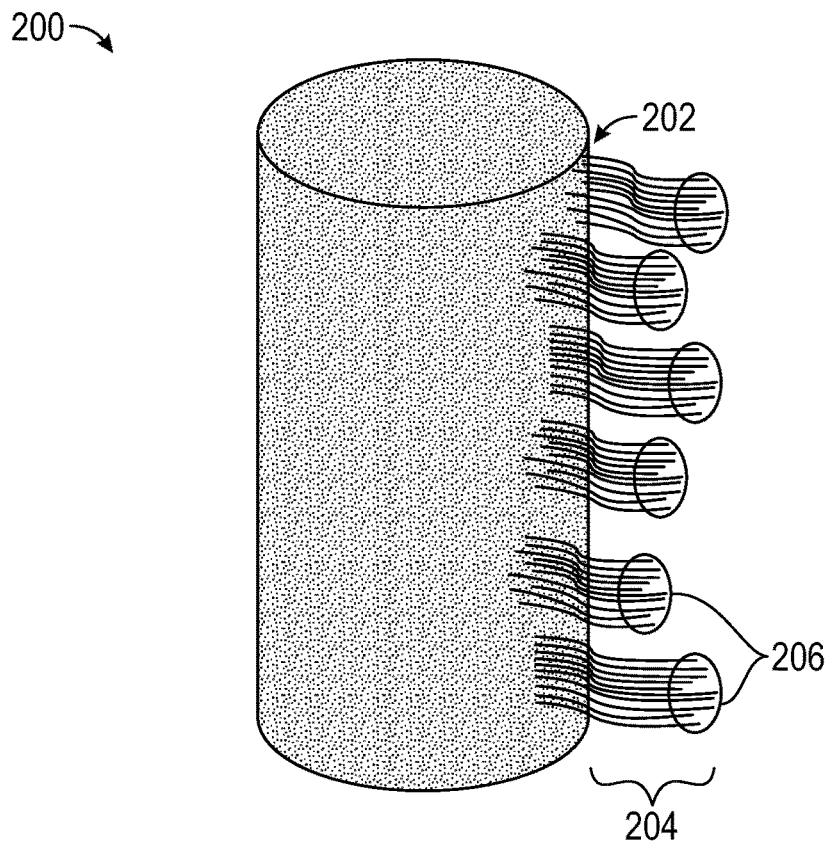
FIG. 2 is a simplified schematic of embodiment polymer grafted graphene particle adhered to a tool surface.

FIG. 2 shows a schematic depiction of an embodiment mono-facial polymer-grafted graphene particle adhering to a tool surface 200. In FIG. 2, polymers 204 having anchor functional groups couple to the tool surface 202. In doing so, the graphene particle 206 of the embodiment mono-facial polymer-grafted graphene particle couples to the tool surface 202 such that the non-polymer side of the embodiment particle faces away from the tool surface. The anchoring polymers 204 strongly adhere to the tool surface. The anchor functional groups on the polymers 204 may strongly adhere to the surface via electrostatic interactions. Specifically, a negatively charged end group on the polymer, such as a silicate, phosphonate or carboxylate group, adsorbs strongly onto a positively charged tool surface. The length of time that an anchor functional group may stay adsorbed to a tool surface depends on a number of factors, including the temperature and abrasion at the tool surface. The embodiment graphene particles when adhered to a tool surface provides improved lubricity and corrosion resistance as compared to the tool surface without the embodiment graphene particle.

Tools Treated with Mono-Facial Polymer-Grafted Graphene Particle

In another aspect, embodiments disclosed related to a drilling tool having an embodiment mono-facial polymer-grafted graphene particle adhered to its surface.

In some embodiments, the drilling tool may be a drill bit, subassemblies ("subs") or parts of a bottom hole assembly (BHA), and other downhole support equipment, such as pipes, drill collars, casing, tubing, and in-line pumps, such as an ESP.

In one or more embodiments, other downhole tooling may have an embodiment mono-facial polymer-grafted graphene particle adhered to its surface. In some embodiments, tools used for intelligent completion technologies including fibers, sensors and valves, may have embodiment mono-facial polymer-grafted graphene particles adhered to their surfaces. Mono-facial polymer-grafted graphene may also be useful on wire welded screens.

Exemplary intelligent completion technologies may include an integrated monitoring and control station in each zone that measures water cut, fluid flow rate, pressure, and temperature at the formation face to identify the amount of oil, water, and gas being produced in each zone. Gas fraction may be identified using data analytics. Measurements are made before production from the zone commingles with the flow coming up from below. The various components at each station may have embodiment mono-facial polymer-grafted graphene particles adhered to their surfaces to improve durability during long in-service applications.

In exemplary embodiments, an electric control line connects each of the previously described stations to the next and the entire system to the surface, minimizing connection points and splices, simplifying installation, and increasing reliability. Downhole dual-seal dry-mate connectors eliminate potential leak paths, a common issue with monitoring systems. Power and data are transmitted wirelessly across junctions via an inductive coupler. The couplers enable simultaneous monitoring and control of multiple zones across junctions.

An inductive coupler connects between the lower and upper completion. Eliminating the control line across the junction enables the lower completion to be run in on drillpipe. The pipe can be pushed, pulled, and rotated to overcome friction and reach target depth in extended-reach wells without fear of damaging control lines, removing any restrictions on the length of the wellbore. Subsequently, the upper completion is installed, and the coupler establishes electrical connection between the two.

The electric flow control valve provides continuously variable flow control. An absolute position sensor embedded in the valve sends real time feedback about the choke's position. Operators can observe zonal fluctuations as they occur and make immediate flow adjustments based on recommendations from production optimization software. The valve reacts to surface commands. Each of the previously described components may be coated with embodiment polymer-grafted graphene particles to improve durability of the components.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Thus, particular implementations of the subject matter have been described. Other implementations are within the scope of the following claims Although only a few example embodiments have been described in detail, those skilled in the art will readily appreciate that many modifications are possible in the example embodiments without materially departing from the scope of the disclosure. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims, except for those in which the claim expressly uses the words 'means for' together with an associated function.

What is claimed:

1. A composition of matter comprising:
   mono-facial polymer-grafted graphene particle, where a first side of the graphene particle comprises a grafted polymer; and
   aqueous-based drilling fluid;
   wherein the grafted polymer comprises an anchor functional group selected from the group consisting of a carboxylic acid group, a silane group, a phosphonate group, and combinations thereof; and
   wherein the composition has a coefficient of friction of less than about 0.3.

2. The composition of claim 1, wherein the graphene particle is hydrophobic.

3. The composition of claim 1, wherein the grafted polymer is hydrophilic.

4. The composition of claim 1, wherein the grafted polymer is polymerized from a monomer selected from the group consisting of maleic acid, acrylic acid, itaconic acid, vinyltrimethoxysilane, triethoxyvinylsilane, allyltrimethoxysilane, trimethoxyvinylsilane, vinyltris(trimethylsiloxy)silane, vinyltrimethylsilane, vinylphosphonic acid, allylphosphonic acid, monoammonium salt, diethyl vinylphosphonate, and dimethyl vinylphosphonate.

5. The composition of claim 1, comprising a range of from about 0.01 ppb to 10 ppb (pounds per barrel) of the mono-facial polymer-grafted graphene particle.

6. A method of lubricating a tool surface, the method comprising:
providing an aqueous-based drilling fluid, the aqueous-based drilling fluid having a mono-facial polymer-grafted graphene particle, where a first side of the graphene particle comprises a grafted polymer; and
introducing the aqueous-based drilling fluid into a wellbore such that it contacts a tool surface to form a coated tool;
wherein the grafted polymer comprises an anchor functional group selected from the group consisting of a carboxylic acid group, a silane group, a phosphonate group, and combinations thereof; and
wherein the composition has a coefficient of friction of less than about 0.3.

7. The method of claim 6, wherein the aqueous-based drilling fluid comprises a range of from about 0.01 ppb to 10 ppb (pounds per barrel) of the mono-facial polymer-grafted graphene particle.

8. The method of claim 6, wherein the grafted polymer is polymerized from a monomer selected from the group consisting of maleic acid, acrylic acid, itaconic acid, vinyltrimethoxysilane, triethoxyvinylsilane, allyltrimethoxysilane, trimethoxyvinylsilane, vinyltris(trimethylsiloxy)silane, vinyltrimethylsilane, vinylphosphonic acid, allylphosphonic acid, monoammonium salt, diethyl vinylphosphonate, and dimethyl vinylphosphonate.

9. The method of claim 6, wherein the tool surface is composed of a pure metal, an alloy, a ceramic, a metal oxide, a polymer, and composites thereof.

10. The method of claim 9, wherein the tool surface is composed of chromium steel.

11. The method of claim 6, wherein the coated tool is a drill bit.

* * * * *